(12) United States Patent
Manchi (10) Patent No.: US 11,669,942 B2
(45) Date of Patent: Jun. 6, 2023

(54) IMAGE DE-WARPING SYSTEM

(71) Applicant: Synaptics Incorporated, San Jose, CA (US)

(72) Inventor: Chandranath Manchi, Bangalore (IN)

(73) Assignee: Synaptics Incorporated, San Jose, CA (US)

( * ) Notice: Subject to any disclaimer, the term of this patent is extended or adjusted under 35 U.S.C. 154(b) by 292 days.

(21) Appl. No.: 16/577,275

(22) Filed: Sep. 20, 2019

(65) Prior Publication Data

US 2021/0090220 A1    Mar. 25, 2021

(51) Int. Cl.
*G06T 5/00* (2006.01)
*G06T 5/50* (2006.01)

(52) U.S. Cl.
CPC ............. *G06T 5/006* (2013.01); *G06T 5/50* (2013.01); *G06T 2207/20221* (2013.01)

(58) Field of Classification Search
CPC ............ G06T 5/006; G06T 5/00; G06T 5/50; G06T 2207/20221; G06T 2207/20212; G06T 15/10; G06T 2210/56; G06T 5/001; G06T 2207/20228; G06T 2210/61
USPC ......................................... 382/293–301, 276
See application file for complete search history.

(56) References Cited

U.S. PATENT DOCUMENTS

| | | | | |
|---|---|---|---|---|
| 2003/0103249 | A1* | 6/2003 | Hartmann | G06T 5/006 358/302 |
| 2008/0279471 | A1* | 11/2008 | Hunter | H04N 5/3572 382/260 |
| 2013/0016918 | A1* | 1/2013 | Haribhatt | G06T 5/006 382/275 |
| 2014/0368606 | A1 | 12/2014 | Bassi | |
| 2015/0131924 | A1 | 5/2015 | He et al. | |
| 2016/0119551 | A1 | 4/2016 | Brown et al. | |
| 2016/0321780 | A1* | 11/2016 | Guo | G06T 3/40 |
| 2017/0214899 | A1* | 7/2017 | Meier | H04N 13/271 |
| 2020/0068186 | A1* | 2/2020 | Aoki | G06T 5/006 |

(Continued)

FOREIGN PATENT DOCUMENTS

| KR | 10-2017-0007073 A | 1/2017 |
|---|---|---|
| KR | 10-2018-0034118 A | 4/2018 |

OTHER PUBLICATIONS

International Search Report and Written Opinion dated Sep. 11, 2020, issued in International Application No. PCT/US2020/035847, filed Jun. 3, 2020, 10 pages.

*Primary Examiner* — Claire X Wang
*Assistant Examiner* — Stephen M Brinich
(74) *Attorney, Agent, or Firm* — Paradice & Li LLP (57) ABSTRACT

A method and apparatus for image processing. A de-warping circuit is configured to retrieve, in an ordered sequence, a plurality of de-warping matrices for remapping pixels of a first image from a distorted image space to a corrected image space, where the first image depicts a scene in the distorted image space. The de-warping circuit reads, into a memory buffer, blocks of pixels of the first image based at least in part on the order of the de-warping matrices and generates a plurality of image tiles based on the blocks of pixels of the first image. Each of the image tiles is interpolated from one or more of the retrieved blocks using a respective one of the de-warping matrices. The de-warping circuit writes the plurality of image tiles to an external memory to produce a second image depicting the scene in the corrected image space.

25 Claims, 9 Drawing Sheets

(56) References Cited

U.S. PATENT DOCUMENTS

2020/0126179 A1\* 4/2020 Yan ..................... G06T 3/0018
2021/0042890 A1\* 2/2021 Naidu ..................... G06T 1/60

\* cited by examiner

IMAGE DE-WARPING SYSTEM

TECHNICAL FIELD

The present embodiments relate generally to image processing.

BACKGROUND OF RELATED ART

Image processing enables a captured image to be rendered on a display such that the original scene can be reproduced as accurately as possible given the capabilities or limitations of the image capture device (e.g., camera). For example, a wide-angle lens may be used to capture a larger field of view (FOV) than a standard rectilinear lens. However, wide-angle lenses also introduce geometric nonlinear distortions in the captured images. Example geometric distortions include radial or barrel distortions, tangential distortions, and the like. Thus, image processing may correct the geometric distortions in the captured image so that the scene appears more rectilinear. The process of reversing the geometric distortions introduced by the lens optics and/or perspective of the image capture device is often referred to as de-warping.

SUMMARY

This Summary is provided to introduce in a simplified form a selection of concepts that are further described below in the Detailed Description. This Summary is not intended to identify key features or essential features of the claims subject matter, nor is it intended to limit the scope of the claimed subject matter.

A method and apparatus for image processing is disclosed. One innovative aspect of the subject matter of this disclosure can be implemented in method of image processing. In some embodiments, the method may include steps of retrieving, in an ordered sequence, a plurality of de-warping matrices for remapping pixels of a first image from a distorted image space to a corrected image space, where the first image depicts a scene in the distorted image space; retrieving blocks of pixels of the first image based at least in part on the order of the de-warping matrices; generating a plurality of image tiles based on the blocks of pixels of the first image, where each of the image tiles is interpolated from one or more of the retrieved blocks using a respective one of the de-warping matrices; and combining the plurality of image tiles to produce a second image depicting the scene in the corrected image space.

Another innovative aspect of the subject matter of this disclosure can be implemented in an image processing system. In some embodiments, the system may include a processor, a memory, and a de-warping circuit. The memory stores instructions that, when executed by the processor, causes the system to generate, in an ordered sequence, a plurality of de-warping matrices for remapping pixels from a distorted image space to a corrected image space.

The de-warping circuit is configured to retrieve blocks of pixels of a first image based at least in part on the order of the de-warping matrices, where the first image depicts a scene in the distorted image space; generate a plurality of image tiles based on the blocks of pixels of the first image, where each of the image tiles is interpolated from one or more of the retrieved pixel blocks using a respective one of the de-warping matrices; and combine the plurality of image tiles to produce a second image depicting the scene in the corrected image space.

BRIEF DESCRIPTION OF THE DRAWINGS

The present embodiments are illustrated by way of example and are not intended to be limited by the figures of the accompanying drawings.

DETAILED DESCRIPTION

In the following description, numerous specific details are set forth such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the aspects of the disclosure. However, it will be apparent to one skilled in the art that these specific details may not be required to practice the example embodiments. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory. The interconnection between circuit elements or software blocks may be shown as buses or as single signal lines. Each of the buses may alternatively be a single signal line, and each of the single signal lines may alternatively be buses, and a single line or bus may represent any one or more of a myriad of physical or logical mechanisms for communication between components.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory computer-readable storage medium comprising instructions that, when executed, performs one or more of the methods described above. The non-transitory computer-readable storage medium may form part of a computer program product, which may include packaging materials.

The non-transitory processor-readable storage medium may comprise random access memory (RAM) such as synchronous dynamic random-access memory (SDRAM), read only memory (ROM), non-volatile random-access memory (NVRAM), electrically-erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors. The term "processor," as used herein may refer to any general-purpose processor, conventional processor, controller, microcontroller, special purpose processor, and/or state machine capable of executing scripts or instructions of one or more software programs stored in memory.

Figure 1:
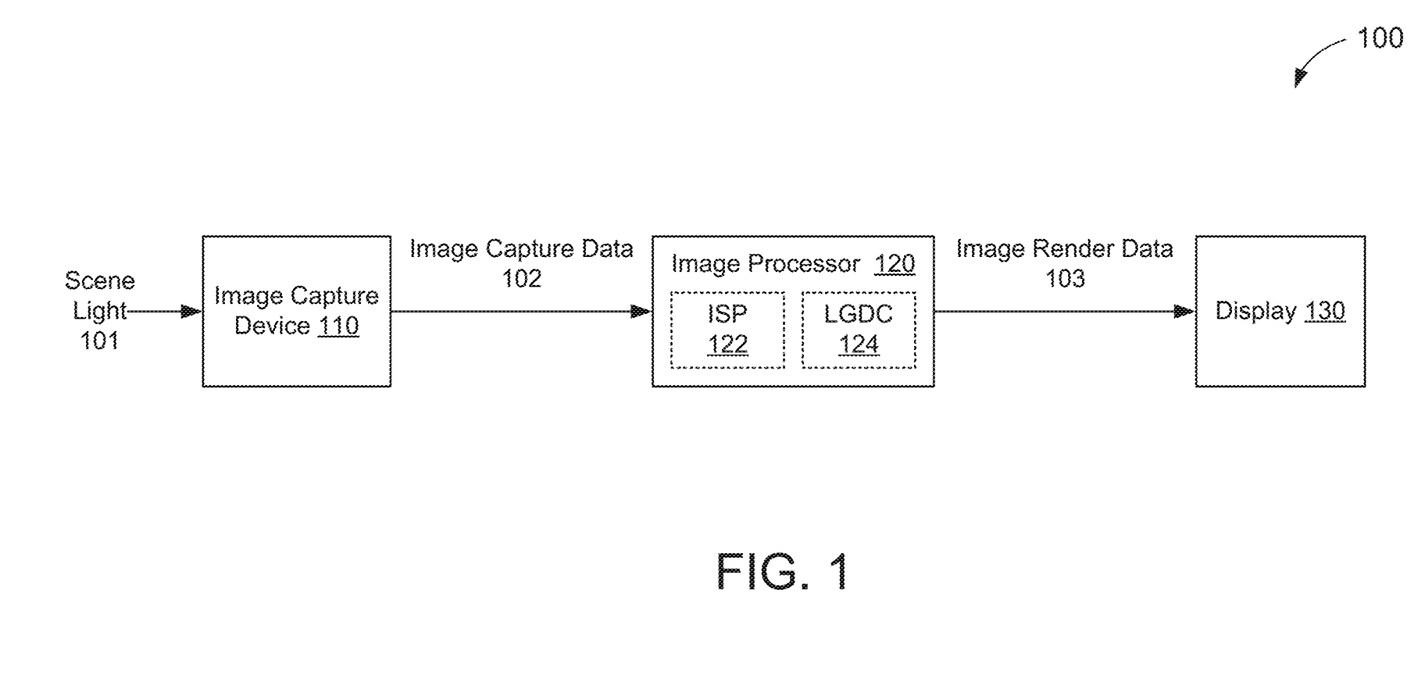
FIG. 1 shows a block diagram of an image capture and display system, in accordance with some embodiments.

FIG. 1 shows a block diagram of an image capture and display system 100, in accordance with some embodiments. The system 100 includes an image capture device 110, an image processor 120, and an image display device 130. The image capture device 110 captures a pattern of light 101 from a scene and converts the captured light 101 to digital image capture data 102. The image capture data 102 may correspond to a digital image depicting the scene. The image display device 130 displays the digital image by reproducing the light pattern on a corresponding display surface. In some aspects, the image capture device 110 may be a camera and the image display device 130 may be an electronic display (such as a television, computer monitor, smartphone, and the like).

The image processor 120 performs image processing on the image capture data 102 to generate image render data 103 that can be used to more accurately reproduce the original scene (captured by the image capture device 110) on the image display device 130. In some embodiments, the image processor 120 may be incorporated or otherwise included in the image capture device 110. The image processor 120 includes an image signal processing (ISP) module 122 and a lens geometric distortion correction (LGDC) module 124. The ISP module 122 may correct various pixel distortions in the image capture data 102 to improve the quality of the digital image. Example pixel distortions include, but are not limited to, vignetting, aberration, and noise.

The LGDC module 124 may convert or transfer the image capture data 102 to a different image space that is more suitable or optimized for display on the image display device 130. For example, a wide-angle lens on an image capture device may introduce geometric distortions (such as radial or barrel distortions, tangential distortions, keystone distortions, and the like) into the scene depicted in the image capture data 102. Thus, the LGDC module 124 may be configured to correct the geometric distortions introduced by the image capture device 110 so that the captured image or scene appears more rectilinear on the image display device 130. In some embodiments, the image render data 103 may be provided to other devices in addition to, or in lieu of, the image display device 130. For example, computer vision processing may benefit from rectilinear images. Examples of computer vision processing may include, but are not limited to, face detection, object detection, and object tracking.

Aspects of the present disclosure recognize that certain applications may require near real-time processing of image capture data 102. Example real-time applications include, but are not limited to, streaming video applications (such as from a content delivery network, video surveillance system, video conferencing system, and the like) and computer vision applications (such as facial recognition systems, automotive driver assistance systems, augmented reality (AR) systems, and the like). However, LGDC operations require complex calculations and data manipulation. A complete software de-warping solution may consume a significant portion of the bandwidth or processing power of the central processing unit (CPU). On the other hand, a complete hardware de-warping architecture may occupy a significant footprint and may offer limited flexibility to reconfigure or tailor the de-warping algorithms to different lens geometries.

In some embodiments, the image processor 120 may implement the LGDC module 124 as a combined hardware and software solution. More specifically, aspects of the present disclosure may leverage the flexibility and scalability of software (e.g., executed by the CPU or a special purpose processor) to generate instructions for remapping one or more pixels of the image capture data 102 to one or more pixels of the image render data 103 based on the lens parameters of the image capture device 110. Aspects of the present disclosure may further leverage the speed and bandwidth of hardware logic to perform the computations and data manipulations set forth in the instructions generated by the CPU.

In some embodiments, the image space of the image render data 103 (e.g., the "corrected image space") may be segmented or subdivided into a plurality of tiles so that the de-warping operations can be performed at a finer granularity. For example, the size of each tile may be configured or optimized based, at least in part, on the memory bandwidth of the LGDC module 124. Performing pixel remapping operations at the tile granularity significantly reduces the amount of hardware overhead needed to de-warp a frame or image of the image capture data 102. This may further reduce the latency or delay of image processing, such that image render data 103 can be generated in near real-time.

Figure 2:
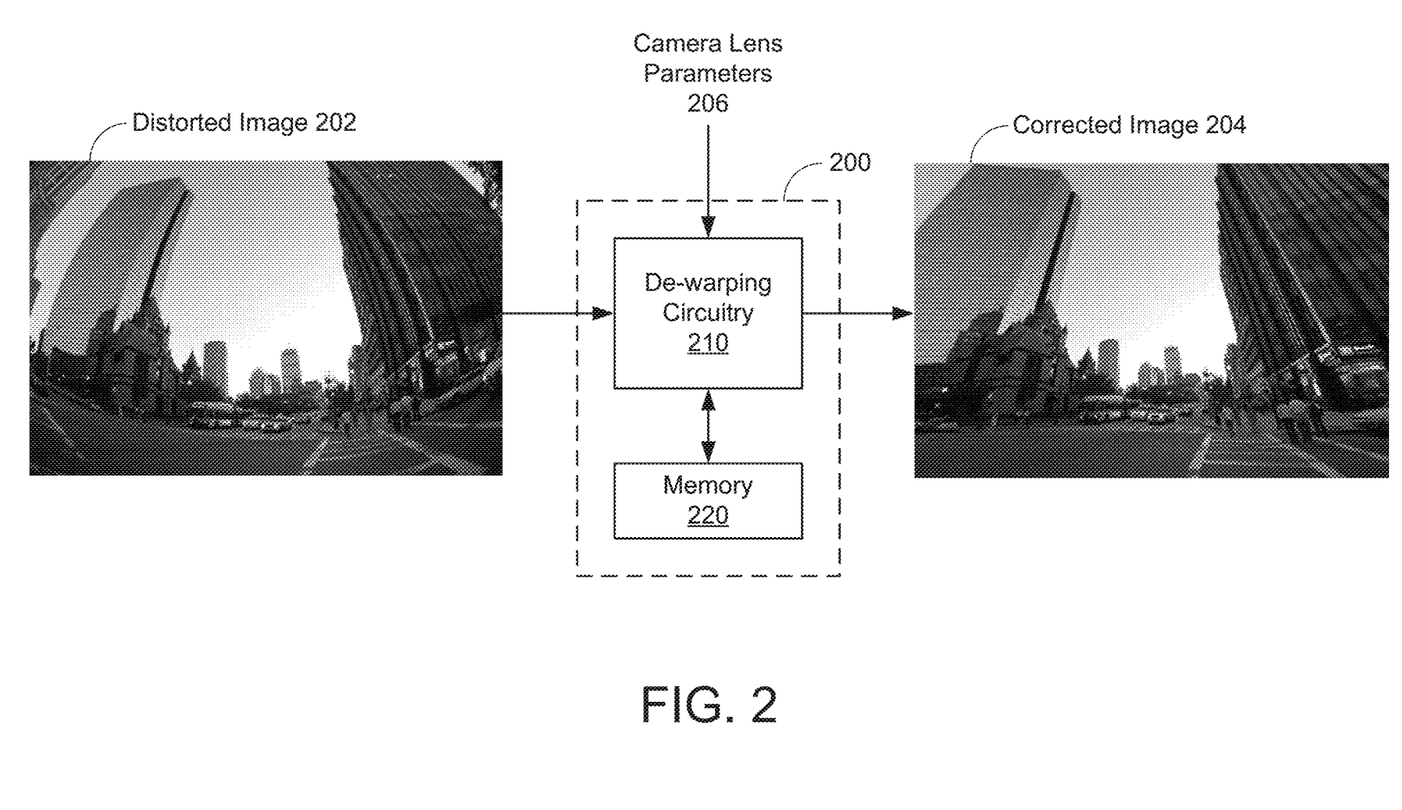
FIG. 2 shows a block diagram of a lens geometric distortion correction (LGDC) circuit, in accordance with some embodiments.

FIG. 2 shows a block diagram of a lens geometric distortion correction (LGDC) circuit 200, in accordance with some embodiments. The LGDC circuit 200 may be one embodiment of the LGDC module 124 of FIG. 1. Thus, the LGDC circuit 200 may be configured to correct geometric distortions in a distorted image 202. For example, the geometric distortions may be introduced by the lens and/or other characteristics of an image capture device used to acquire or otherwise generate the distorted image 202. In some embodiments, the de-warping circuitry 210 may be configured to remap one or more pixels of the distorted image 202 to one or more pixels of a corrected image 204 so that the corrected image 204 appears substantially rectilinear.

In the embodiment of FIG. 2, the distorted image 202 may be captured by a camera (or other image capture device) with a wide-angle lens. As a result, the scene depicted in the distorted image 202 appears radially distorted. For example, objects having straight lines (such as buildings) appear curved in the distorted image 202. In contrast, the scene depicted in the corrected image 204 appears rectilinear. For example, objects having straight lines appear straight in the corrected image 204. As used herein, the term "distorted image space or DIS" refers to an image space of the distorted image 202 (e.g., before de-warping) and the term "corrected image space or CIS" refers to an image space of the corrected image 204 (e.g., after de-warping).

The LGDC circuit 200 includes de-warping circuitry 210 and a memory 220. The de-warping circuitry 210 may receive image data corresponding to the distorted image 202 and may output corrected image data corresponding to the corrected image 204. In some aspects, the corrected image 204 may have the same dimensions (e.g., pixel height and pixel width) as the distorted image 202. However, less of the scene may be depicted in the corrected image 204 than the distorted image 202. For example, the building in the upper-left corner of the distorted image 202 is not shown in the corrected image 204. Thus, the de-warping circuitry 210 may interpolate each pixel of the corrected image 204 from one or more pixels of the distorted image 202.

In some embodiments, the de-warping circuitry 210 may determine the remapping of pixels from the distorted image space to the corrected image space based, at least in part, on one or more camera lens parameters 206 of the image capture device. Example lens parameters 206 may include, but are not limited to, lens geometries and focal length. Because the de-warping operation is to reverse the geometric distortions introduced by the camera lens, the pixel remapping may be an inverse of the pixel mapping created by the camera lens. In some aspects, the de-warping circuitry 210 may determine the pixel remapping calculations based on a polynomial lens model. In some other aspects, the de-warping circuitry 210 may determine the pixel remapping calculations based on a non-polynomial lens model.

The memory 220 may be configured to store or buffer any data needed to complete the de-warping operation. The data stored in the memory 220 may include, but is not limited to, the camera lens parameters 206, the pixel remapping calculations (e.g., matrices), an order of indices for fetching distorted image blocks, image data for the distorted image 202, and image data for the corrected image 204. Because the amount of storage in the memory 220 is limited, it may be inefficient (if not impossible) to store a complete set of pixel data for the entire frame of the distorted image 202 and/or the corrected image 204. Thus, in some embodiments, the LGDC circuit 200 may be configured to generate small portions (e.g., tiles) of the corrected image 204 at a time. Since each portion of the corrected image 204 is interpolated from only on a relatively small subset (e.g., block) of pixels of the distorted image 202, aspects of the present disclosure may substantially reduce the memory bandwidth requirements of the memory 220.

Figure 3:
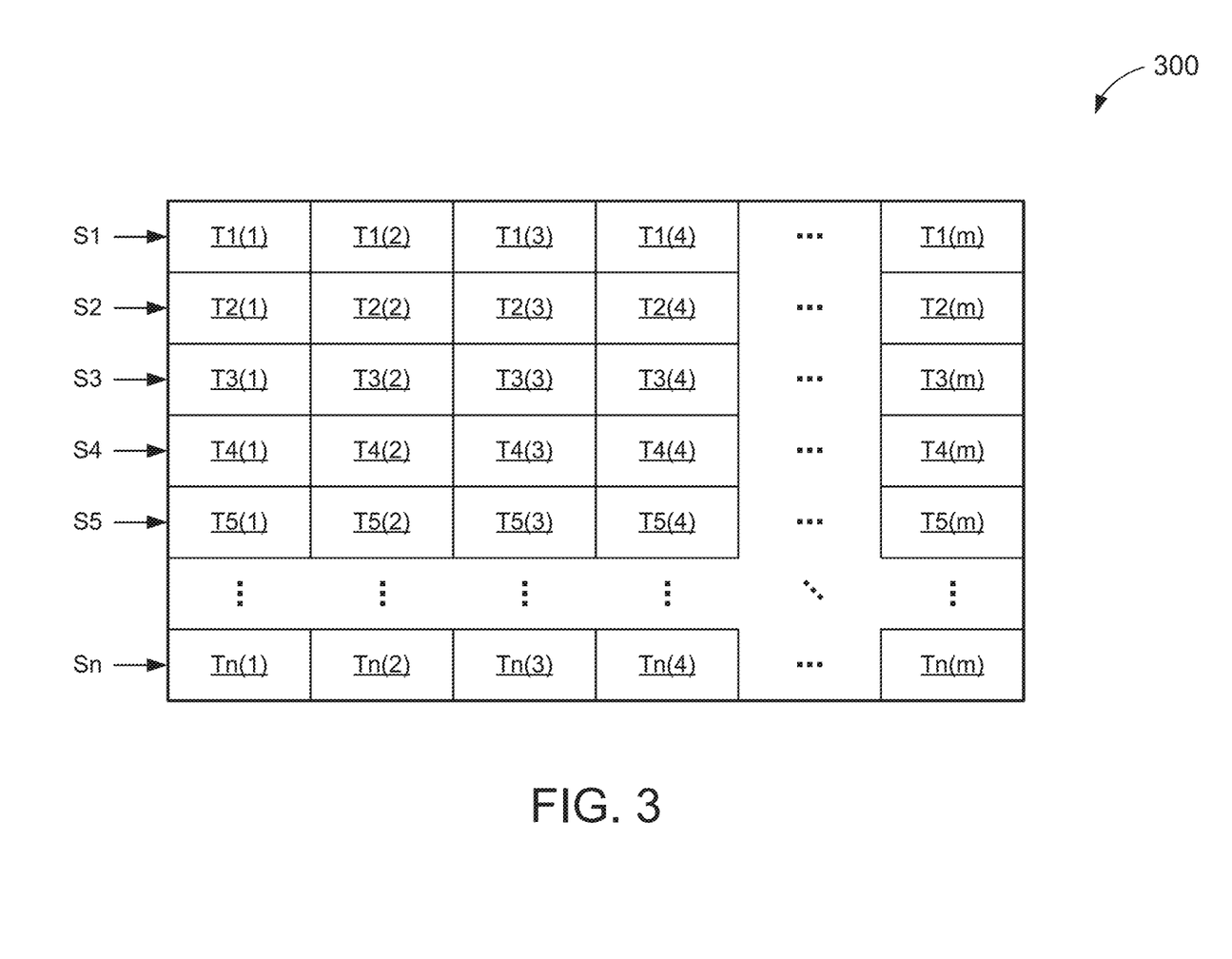
FIG. 3 shows an example corrected image space, in accordance with some embodiments.

FIG. 3 shows an example corrected image space 300, in accordance with some embodiments. The corrected image space 300 may be one embodiment of the image space of the corrected image 204 of FIG. 2. As shown in FIG. 3, the corrected image space 300 is segmented or subdivided into a plurality of tiles T1(1)-Tn(m) of equal or uniform size. Each tile may include a plurality of pixels of the corrected image space 300. In some embodiments, the size (e.g., pixel height and pixel width) of each tile may be based, at least in part, on the memory bandwidth of the LGDC circuit (such as the memory 220 of FIG. 2). In some other embodiments, the size of each tile may be based, at least in part, on a pixel depth and/or color format of the corrected image (such as the corrected image 204 of FIG. 2).

Each row of tiles may form a respective stride. For example, stride S1 may include tiles T1(1)-T1(m), stride S2 may include tiles T2(1)-T2(m), stride S3 may include tiles T3(1)-T3(m), and so forth. Thus, each of the strides S1-Sn may span a width of the corrected image space 300 (e.g., corresponding to a combined pixel width of tiles T1(1)-T1(m)) and may have a height equal to the pixel height of one of the tiles. In some embodiments, de-warping may be performed on each of the tiles, in a raster order, one stride at a time. For example, the de-warping circuitry may successively process each of the tiles of stride S1, from left to right (e.g., T1(1), T1(2), . . . , T1(m)), before proceeding to process each of the tiles of stride S2, from left to right (e.g., T2(1), T2(2), . . . , T2(m)).

The size and dimensions of each stride may depend, at least in part, on the raster order of display updates and/or the granularity of each update. In the embodiment of FIG. 3, the strides S1-Sn are shown to correspond with horizontal rows of the corrected image space 300, for example, to support near real-time de-warping for horizontal display updates. In other embodiments, the strides may correspond with vertical columns of the corrected image space 300, for example, to support near real-time de-warping for vertical display updates. For example, the de-warping circuitry may successively process an entire column of tiles, from top to bottom (e.g., T1(1), T2(1), . . . , Tn(1)), before proceeding to process the next column of tiles, from top to bottom (e.g., T1(2), T2(2), . . . , Tn(2)). Still further, in some embodiments, multiple strides of the corrected image space 300 may be processed concurrently (e.g., using multithreading).

Aspects of the present disclosure recognize that the mapping of pixels between the corrected image space 300 and a distorted image space may be non-linear. With reference for example to FIG. 2, geometric distortions may be more pronounced on the edges or periphery of the distorted image 202 compared to the center of the image. Thus, pixels at the center of corrected image 204 may map to the pixels at the center of the distorted image 202. However, pixels at the corners and edges of the corrected image 204 may not map to pixels at respective corners and edges of the distorted image 202. Rather, the pixels at the corners and edges of the corrected image 204 may map to pixels that are closer to the center of the distorted image 202.

Figure 4:
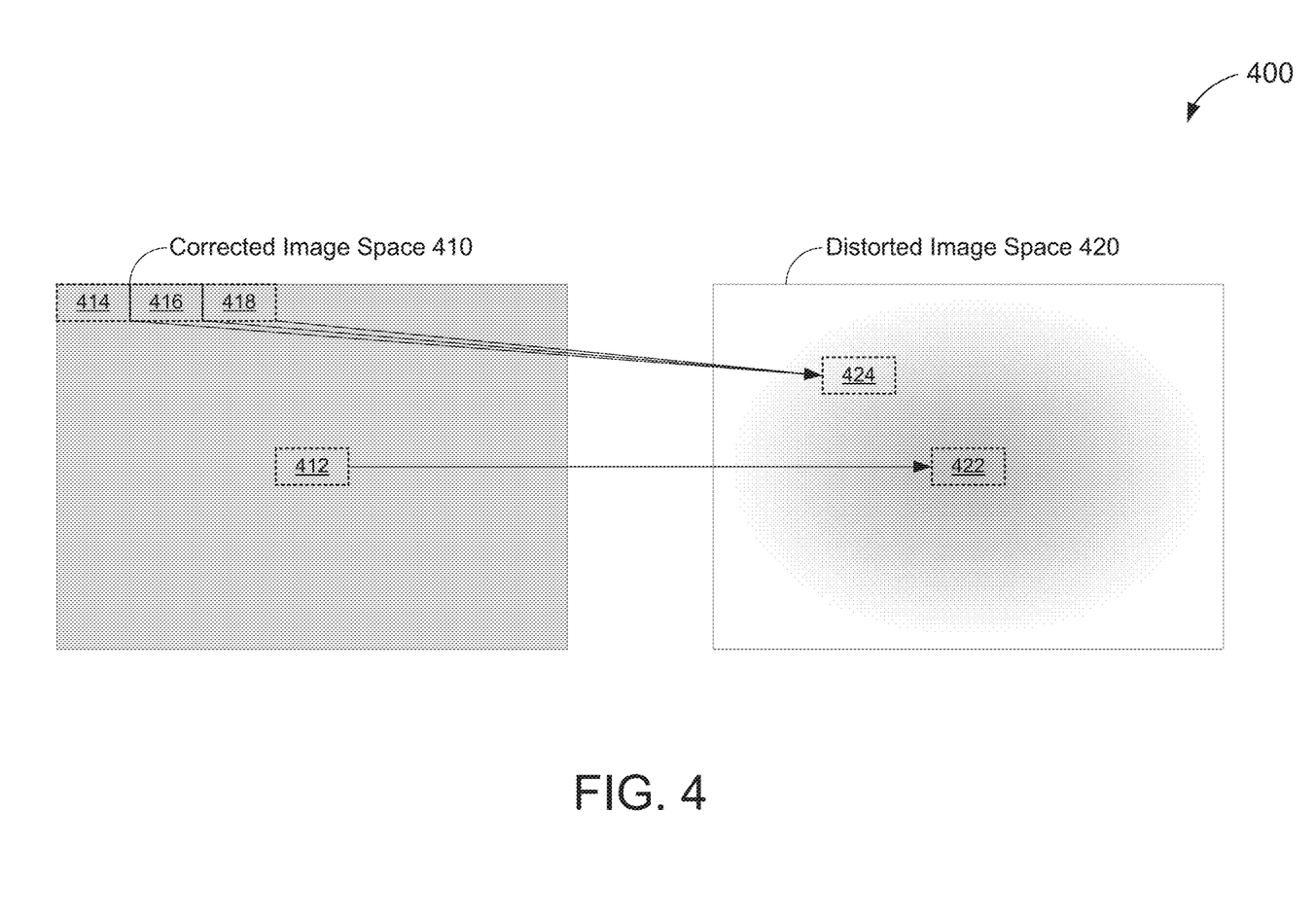
FIG. 4 shows an example pixel mapping between a corrected image space and a distorted image space.

FIG. 4 shows an example pixel mapping 400 between a corrected image space 410 and a distorted image space 420. The corrected image space 410 may be one embodiment of the corrected image space 300 of FIG. 3. In the embodiment of FIG. 4, the distortion is relatively unpronounced at the center of the distorted image space 420. For example, a tile 412 at the center of the corrected image space 410 may map to a block of pixels 422 at the center of the distorted image space 420. However, the distortion becomes significantly more pronounced towards the edges of the distorted image space 420. For example, tiles 414, 416, and 418 at the upper-left corner of the corrected image space 410 may each map to the same block of pixels 424 in the distorted image space 420.

Thus, in some embodiments, a respective de-warping matrix (or set of matrices) may be generated for each tile of the corrected image space 410. Each de-warping matrix may define a pixel mapping between a particular tile of the corrected image space 410 and a corresponding block of pixels of the distorted image space 420. In some embodiments, the size (e.g., pixel height and pixel width) of each block of pixels in the distorted image space 420 may be based at least in part on the size of each tile of the corrected image space 410 and/or the memory bandwidth of the LGDC circuitry. In some aspects, the tile size of the corrected image space 410 and the block size of the distorted image space 420 may be configured based, at least in part, on a tile granularity of the memory storage format. More specifically, the tile granularity may limit the size of blocks and/or tiles depending on the image format and pixel depth of the image stored in memory.

In some embodiments, the relationship between the tile size of the corrected image space 410 and the block size of the distorted image space 420 may also vary with respect to one or more lens distortion parameters. For example, when the distorted image space 420 represents a substantially wider field-of-view than the corrected image space 410, the block size of the distorted image space 420 may be significantly larger than the tile size of the corrected image space 410. However, for less significant distortions, the block size of the distorted image space 420 may be closer to the tile size of the corrected image space 410. In some aspects, blocks of the distorted image space 420 may be larger than (e.g., at least twice the size of) tiles of the corrected image space 410. As described in greater detail below, this may reduce the number and/or frequency of block read operations (e.g., from memory) needed to process each tile of the corrected image space 410.

Figure 5:
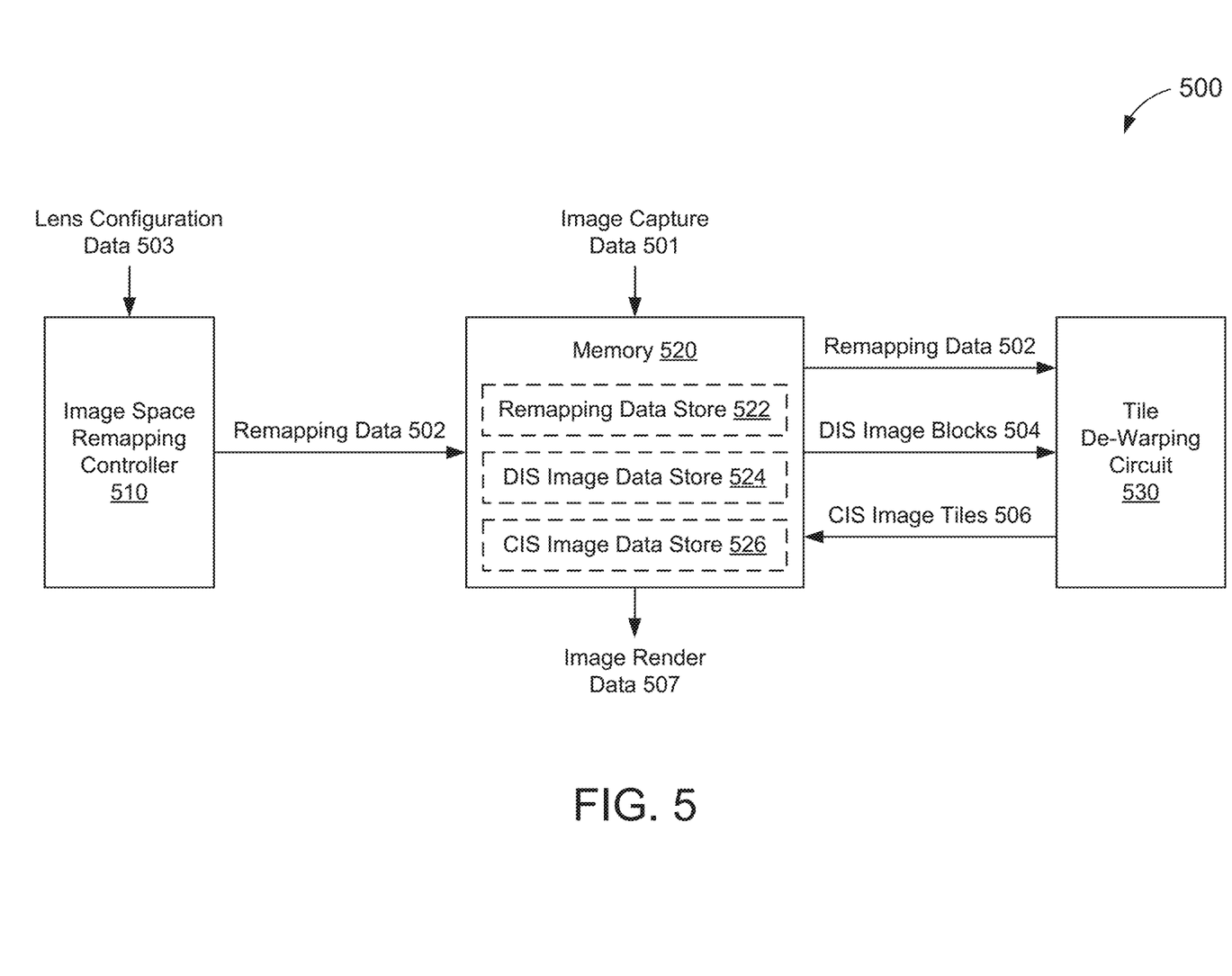
FIG. 5 shows a block diagram of an LGDC system, in accordance with some embodiments.

FIG. 5 shows a block diagram of an LGDC system 500, in accordance with some embodiments. The LGDC system 500 may be one embodiment of the LGDC circuit 200 of FIG. 2. Thus, the LGDC system 500 may be configured to correct geometric distortions in image capture data 501. The LGDC system 500 includes an image space remapping controller 510, a memory 520, and a tile de-warping circuit 530.

The image space remapping controller 510 may be configured to generate remapping data 502 to be used for remapping pixels of the image capture data 501 from a distorted image space to a corrected image space. In some embodiments, the remapping data 502 may include a plurality of de-warping matrices and a plurality of lookup tables (LUTs) identifying the blocks of pixels of the image capture data 501 to be used by the de-warping matrices. As described with respect to FIGS. 3 and 4, each de-warping matrix may define a pixel mapping between a respective tile of the corrected image space and one or more blocks of pixels of the distorted image space. Thus, the de-warping matrices may define a series of de-warping operations (e.g., computations) to be performed by the de-warping circuit 530.

The image space remapping controller 510 may generate the de-warping matrices based, at least in part, on lens configuration data 503 associated with an image capture device used to capture the image capture data 501. For example, the lens configuration data 503 may indicate one or more lens parameters of the image capture device (such as lens geometry and focal length). In some aspects, the lens configuration data 503 may be provided to the remapping controller 510 at a device manufacturing stage. In some other aspects, the lens configuration data 503 and/or new lens configuration data may be provided to the remapping controller 510 at any time after the manufacture of the LGDC system 500. Thus, the LGDC system 500 may be configured (and reconfigured) to de-warp images captured by various image capture devices.

The LUTs may specify an order in which blocks of pixels of the image capture data 501 are to be retrieved and operated on by the de-warping circuit 530. The order of blocks identified by the LUTs may be based, at least in part, on the order of de-warping matrices to be implemented by the de-warping circuit 530. More specifically, the LUTs may ensure that the de-warping circuit 530 retrieves the necessary blocks of pixels, in the correct order, to interpolate each tile of the corrected image space. In some embodiments, the de-warping matrices may be processed by the de-warping circuit 530 in a raster order (e.g., as described above with respect to FIG. 3). Thus, the order of blocks specified by the LUTs may also depend on the raster order of tiles in the corrected image space.

The memory 520 may be configured store or buffer any data needed to complete the de-warping operation. In some embodiments, the memory 520 may be a dynamic random-access memory (DRAM). The memory 520 may include a remapping data store 522, a distorted image space (DIS) image data store 524, and a corrected image space (CIS) image data store 526. The remapping data store 522 may store or buffer the remapping data 502 from the remapping controller. The DIS image data store 524 may store or buffer the image capture data 501. In some aspects, the DIS image data store 524 may be configured to store full-frame pixel data depicting a scene in the distorted image space. The CIS image data store 526 may store or buffer image render data 507 to be output to another device or electronic system (such as the image display device 130 of FIG. 1). In some aspects, the CIS image data store 526 may be configured to store full-frame pixel data depicting the scene in the corrected image space.

The de-warping circuit 530 may be configured to generate the image render data 507 based on the image capture data 501. For example, the de-warping circuit 530 may interpolate each pixel of the image render data 507 from one or more pixels of the image capture data 501 (e.g., using bicubic interpolation techniques). In some embodiments, the de-warping circuit 530 may operate on a per-tile granularity of the corrected image space. More specifically, the de-warping circuit 530 may process each tile of the corrected image space, in succession, based on the order of the de-warping matrices stored in the remapping data store 522 (e.g., a raster order).

The de-warping circuit 530 may retrieve the remapping data 502 from the remapping data store 522 to determine the de-warping matrix associated with each tile of the corrected image space. The de-warping circuit 530 may also determine the blocks of pixels (e.g., of the image capture data 501) to be operated on based on the LUTs included in the remapping data 502. For example, the de-warping circuit 530 may retrieve one or more DIS image blocks 504 from the DIS image data store 524 in an order specified by the LUTs. The de-warping circuit 530 may perform bicubic interpolation on the DIS image blocks 504, as defined by the de-warping matrices, to produce one or more CIS image tiles 506. The de-warping circuit 530 may then store the CIS image tiles 506 in the CIS image data store 526 as the image render data 507. Accordingly, the CIS image tiles 506 may be combined (e.g., in a raster order) to produce a full-frame image depicting the scene of the image capture data 501 in the corrected image space.

In some embodiments, the remapping controller 510 may be implemented in software. For example, the remapping controller 510 may comprise a set of instructions that are executed by a general-purpose processor or CPU. This provides greater scalability and flexibility in the design and/or configuration of the de-warping matrices. For example, the algorithms for reversing the geometric distortion of the camera lens may be user-configurable (and reconfigurable). Accordingly, aspects of the present disclosure may support de-warping matrices that are based on a polynomial lens model or a non-polynomial lens model (e.g., for correcting radial or tangential distortions). In some other aspects, the de-warping matrices may be configured or updated to support additional geometric distortion corrections including, but not limited to, tilt, zoom, rotation, and point of focus changes.

In some embodiments, the de-warping circuit 530 may be implemented in hardware. For example, the de-warping circuit 530 may comprise a set of transistors or logic gates that are hardwired to perform the calculations or mathematical operations defined by the de-warping matrices, such as bicubic interpolation or other pixel remapping functions. This provides for greater speed and bandwidth in interpolating the image render data 507. By processing the image render data 507 at a tile-size granularity, aspects of the present disclosure may further reduce the latency of the de-warping process while also optimizing the use of available bandwidth and resources. As a result, frames of image render data 507 may be generated in near real-time (e.g., such that the image render data 507 is output by LGDC system 500 at substantially the same rate as the image capture data 501 is received by the system 500).

Figure 6:
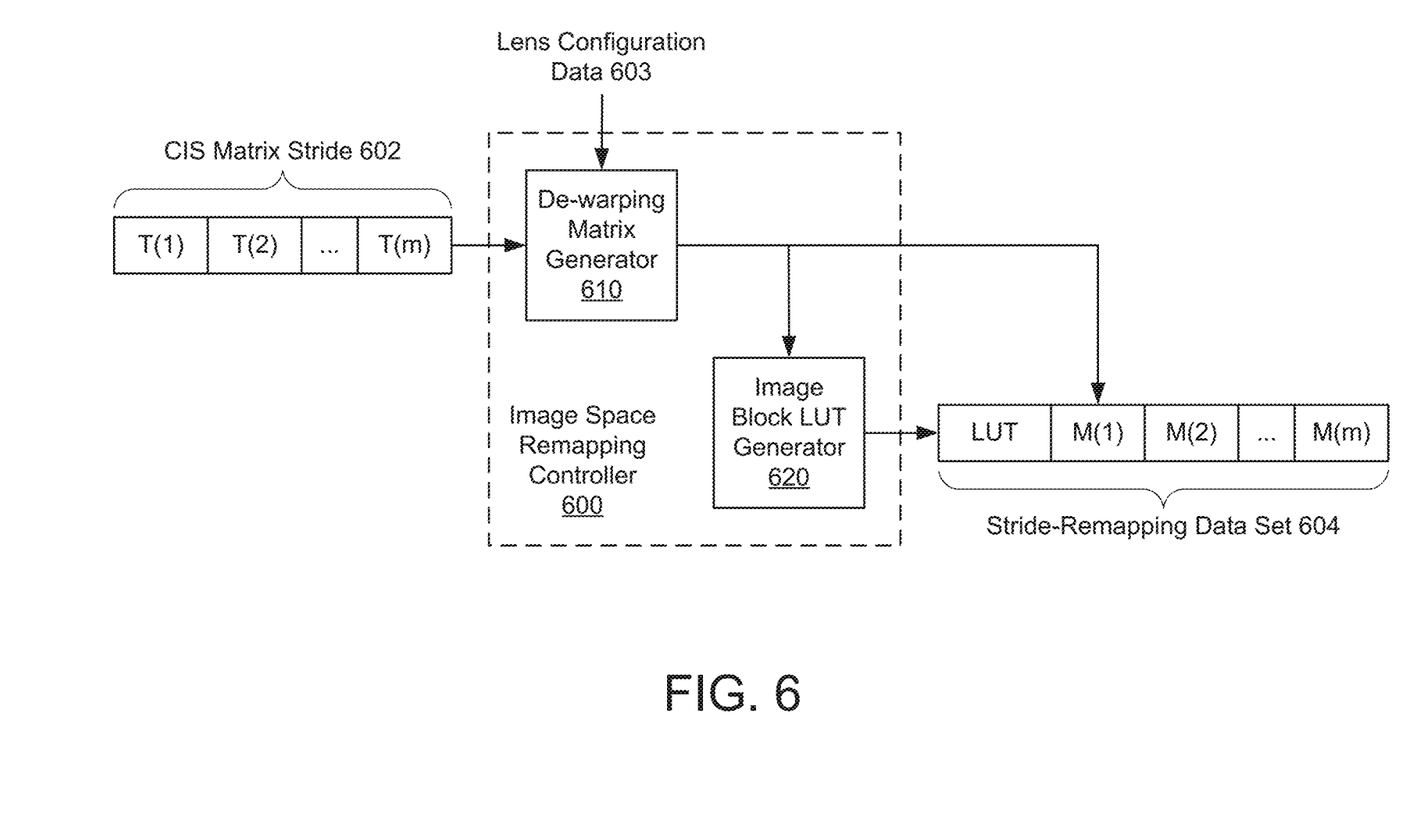
FIG. 6 shows a block diagram of an image space remapping controller, in accordance with some embodiments.

FIG. 6 shows a block diagram of an image space remapping controller 600, in accordance with some embodiments. The remapping controller 600 may be one embodiment of the image space remapping controller 510 of FIG. 5. Thus, the remapping controller 600 may be configured to generate remapping data to be used for remapping pixels of the image capture data 501 of FIG. 5 from a distorted image space to a corrected image space. In some embodiments, the remapping controller 600 may generate a stride-remapping data set 604 for each stride 602 of the corrected image space (CIS). The remapping controller 600 includes a de-warping matrix generator 610 and an image block LUT generator 620.

The de-warping matrix generator 610 is configured to generate a plurality of de-warping matrices M(1)-M(m) based, at least in part, on lens configuration data 603 associated with an image capture device. Each of the de-warping matrices M1(1)-M(m) may be associated with a respective CIS matrix tile T(1)-T(m) of the current CIS matrix stride 602. The matrix elements in each CIS matrix tile TO may refer to row and column indices of the CIS pixels. In some embodiments, the de-warping matrices M(1)-M(m) may define a pixel mapping between the CIS pixels and the pixels of the distorted image space (DIS). Thus, the matrix elements in each de-warping matrix MO may refer to row and column indices of the DIS pixels.

In some embodiments, the matrix generator 610 may process each of the CIS matrix tiles T(1)-T(m) in a raster order (e.g., as described above with respect to FIG. 3). In some aspects, each de-warping matrix element may include high-precision pixel references to pixels in the referenced DIS block. When processing each pixel of a given CIS matrix tile, the associated de-warping matrix element also specifies one or more fractional coordinates for the intra-pixel DIS pixel references in the DIS blocks from which the pixel is to be interpolated.

The image block LUT generator 620 is configurate to generate a respective block lookup table (LUT) for each CIS matrix stride 602. Each LUT may identify one or more DIS blocks associated with the CIS matrix stride 602. Because memory buffer space may be limited, the LUT may specify an order in which the DIS blocks are to be retrieved for processing by the de-warping circuitry (such as the tile de-warping circuit 530 of FIG. 5). More specifically, the order of the DIS blocks may align with an order of the de-warping matrices M(1)-M(m) so that the necessary DIS blocks can be pre-fetched for the processing of each of the CIS matrix tiles T(1)-T(m).

In some embodiments, the LUT generator 620 may determine the DIS blocks to be included in the LUT based, at least in part, on the pixel references included in each of the de-warping matrices M(1)-M(m). For example, the LUT generator 620 may determine a region of the distorted image space bounded by the maximum and minimum pixel references in a particular de-warping matrix (or set of matrices). The LUT generator 620 may further identify one or more DIS blocks bounded by (or coinciding with) the identified region and correlate the DIS blocks with the de-warping matrix. For example, each DIS block in the LUT may be identified by a DIS block column and row offset address along with a count or other indicator of the CIS matrix it serves.

The LUT may be appended to the de-warping matrices M(1)-M(m) and stored in system memory (such as the memory 520 of FIG. 5) as a stride-remapping data set 604. In some embodiments, the LUT may be compressed (e.g., using run-length encoding) to reduce the storage overhead of the data set 604. In some other embodiments, the remapping matrices M(1)-M(m) may also be compressed to further reduce the storage overhead and/or alleviate bandwidth congestion. The LUT generator 620 may process each stride 602 of the corrected image space, in succession (e.g., raster order), for each frame of image capture data. In some aspects, the LUT generator 620 may output each stride-remapping data set 604 as a continuous data stream.

Figure 7:
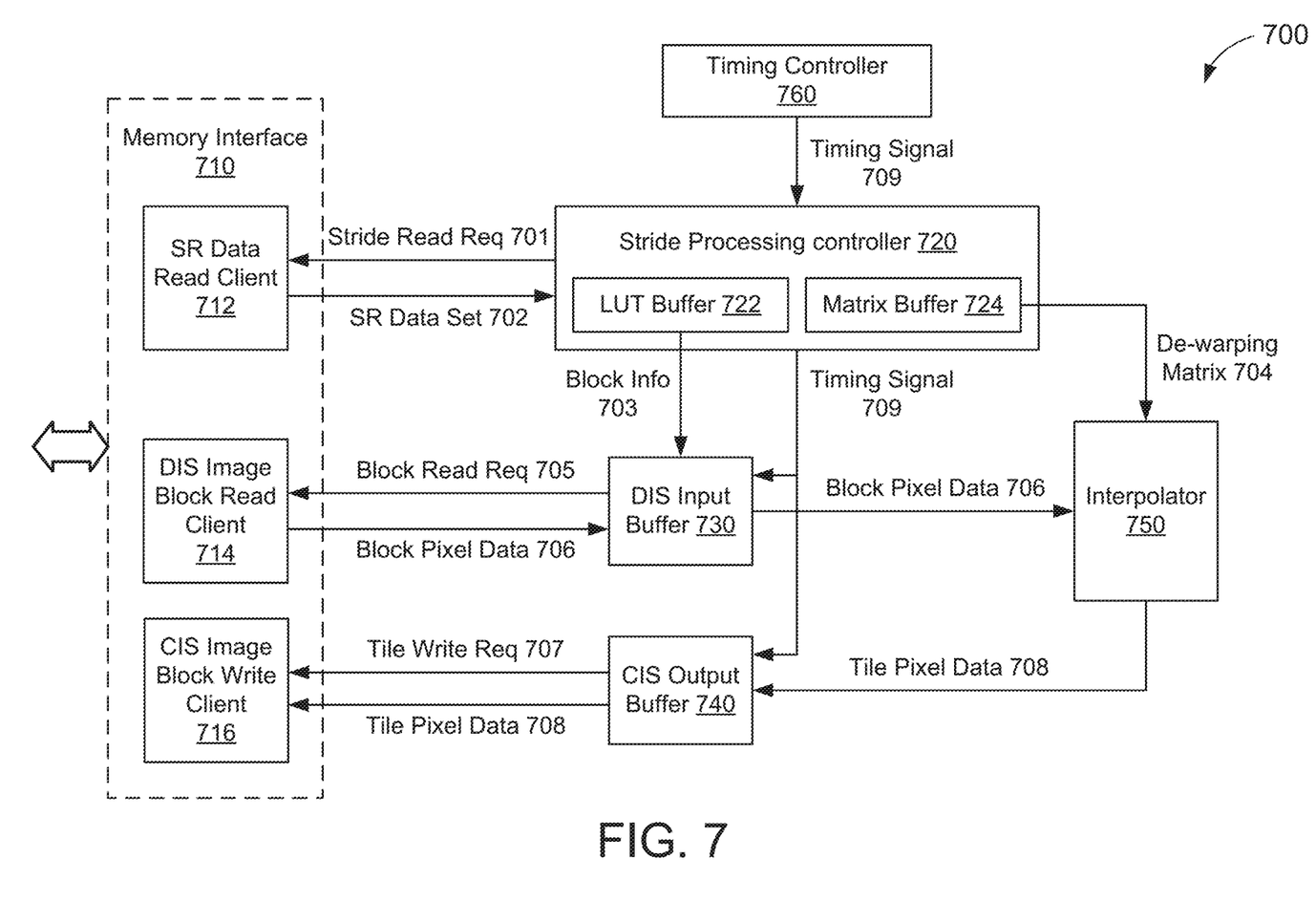
FIG. 7 shows a block diagram of a tile de-warping circuit, in accordance with some embodiments.

FIG. 7 shows a block diagram of a tile de-warping circuit 700, in accordance with some embodiments. The de-warping circuit 700 may be one embodiment of the tile de-warping circuit 530 of FIG. 5. Thus, the de-warping circuit 700 may be configured to generate corrected image data based on distorted image data. In some embodiments, the de-warping circuit 700 may process each tile of the corrected image space individually (e.g., in a raster scan order) by interpolating tile pixel data 708 from corresponding block pixel data 706 of the distorted image space.

The de-warping circuit 700 include a memory interface 710, a stride processing controller 720, a distorted image space (DIS) input buffer 730, a corrected image space (CIS) output buffer 740, an interpolator 750, and a timing controller 760. The memory interface 710 provides an interface through which the de-warping circuit 700 may communicate with a system memory (such as the memory 520 of FIG. 5). The memory interface 710 may include a stride remapping (SR) data read client 712, a DIS image block read client 714, and a CIS image block write client 716. The stride remapping data read client 712 may read stride-remapping (SR) data sets 702 from memory in response to stride read requests 701. The DIS image block read client 714 may read block pixel data 706 from memory in response to block read requests 705. The CIS image block write client 716 may write tile pixel data 708 to memory in response to tile write requests 707. In some aspects, the CIS image block write client 716 may write the tile pixel data 708 to the memory in the raster scan order The stride processing controller 720 may process a stride of the corrected image space. As described with respect to FIG. 3, the corrected image space may comprise a plurality of strides having a predetermined pixel height and spanning a width of the corrected image space. The stride processing controller 720 may output a respective stride read request 701 for processing each stride of the corrected image space. The stride remapping data read client 712 returns an SR data set 702 to the stride processing controller 720 in response to the stride read request 701. As described with respect to FIG. 6, the SR data set 702 may include a block LUT and a plurality of de-warping matrices M(1)-M(m). Each de-warping matrix may define a pixel mapping between a respective tile of the corrected image space and one or more DIS blocks. The LUT may identify the DIS blocks that serve each de-warping matrix. The stride processing controller 720 may store the block LUT and de-warping matrices in a LUT buffer 722 and a matrix buffer 724, respectively. In some embodiments, the matrix buffer 724 may be configured to store only a single de-warping matrix at a time.

The DIS input buffer 730 may read block information 703 from the LUT buffer 722 to determine which DIS blocks are to be retrieved from memory. For example, the block information 703 may be parsed from the LUT and provided to the DIS input buffer 730 in the order in which the de-warping matrices are to be processed. The block information 703 may include the indices of one or more DIS blocks to be read from memory and a count value indicating the number of de-warping matrices that reference each of the DIS blocks. The DIS input buffer 730 may output a respective block read request 705 for each DIS block (or set of DIS blocks) with an index specified in the current block information 703. The DIS image block read client 714 returns block pixel data 706, for the requested DIS block(s), to the DIS input buffer 730. The DIS input buffer 730 may store or buffer the block pixel data 706 until subsequent block information 703 is read from the LUT buffer 722.

The interpolator 750 may process each tile of the corrected image space based on the block pixel data 706 and a respective de-warping matrix 704. For example, the interpolator 750 may read each de-warping matrix 704 from the matrix buffer 724 in raster order. For each de-warping matrix 704, the interpolator 750 may use the buffered block pixel data 706 to generate a corresponding tile of the corrected image space in accordance with the pixel mappings specified by the de-warping matrix 704. In some embodiments, the interpolator 750 may generate each tile based on a bicubic interpolation of the reference points indicated by the de-warping matrix in the block pixel data 706. For example, the interpolator 750 may interpolate each tile using 4 luma (Y) pixels and 4 chroma (UV) pixels of the block pixel data 706 and the fractional offsets indicated by the de-warping matrix 704.

The CIS output buffer 740 may buffer the output of the interpolator 750 (e.g., tile pixel data 708) until a completed tile is stored in the CIS output buffer 740. When the tile pixel data 708 in the CIS output buffer 740 represents a complete tile of the corrected image space, the CIS output buffer 740 may write the tile back to system memory. For example, the CIS output buffer 740 may output a tile write request 707, along with the tile pixel data 708, to the CIS image block write client 716. In some embodiments, each completed tile may be written to the system memory, in a raster order, before the interpolator 750 begins processing the next tile in the corrected image space (or the next de-warping matrix 704). Accordingly, the image render device (or image analysis device) may render the tile pixel data 708, in near real-time, as the de-warping is completed by the de-warping circuit 700.

The timing controller 760 may generate a timing signal 709 to control a timing of the stride processing controller 720, the DIS input buffer 730, and the CIS output buffer 740. More specifically, the timing signal 709 may be used to synchronize the operations of the stride processing controller 720, the DIS input buffer 730, and the CIS output buffer 740. For example, the timing signal 709 may ensure that the block LUT is first loaded into the LUT buffer 722 and that the DIS input buffer 730 retrieves the block pixel data 706 identified by the LUT before the stride processing controller 720 retrieves the de-warping matrices 704 associated with the block pixel data 706. Because multiple de-warping matrices 704 may depend on the same block pixel data 706, the DIS input buffer 730 need not retrieve new block pixel data 706 for each successive de-warping matrix 704. In some aspects, the DIS input buffer 730 may output a new block read request 705 when the number of de-warping matrices processed by the interpolator 750 reaches the count value associated with the current DIS block(s) stored in the DIS input buffer 730.

Figure 8:
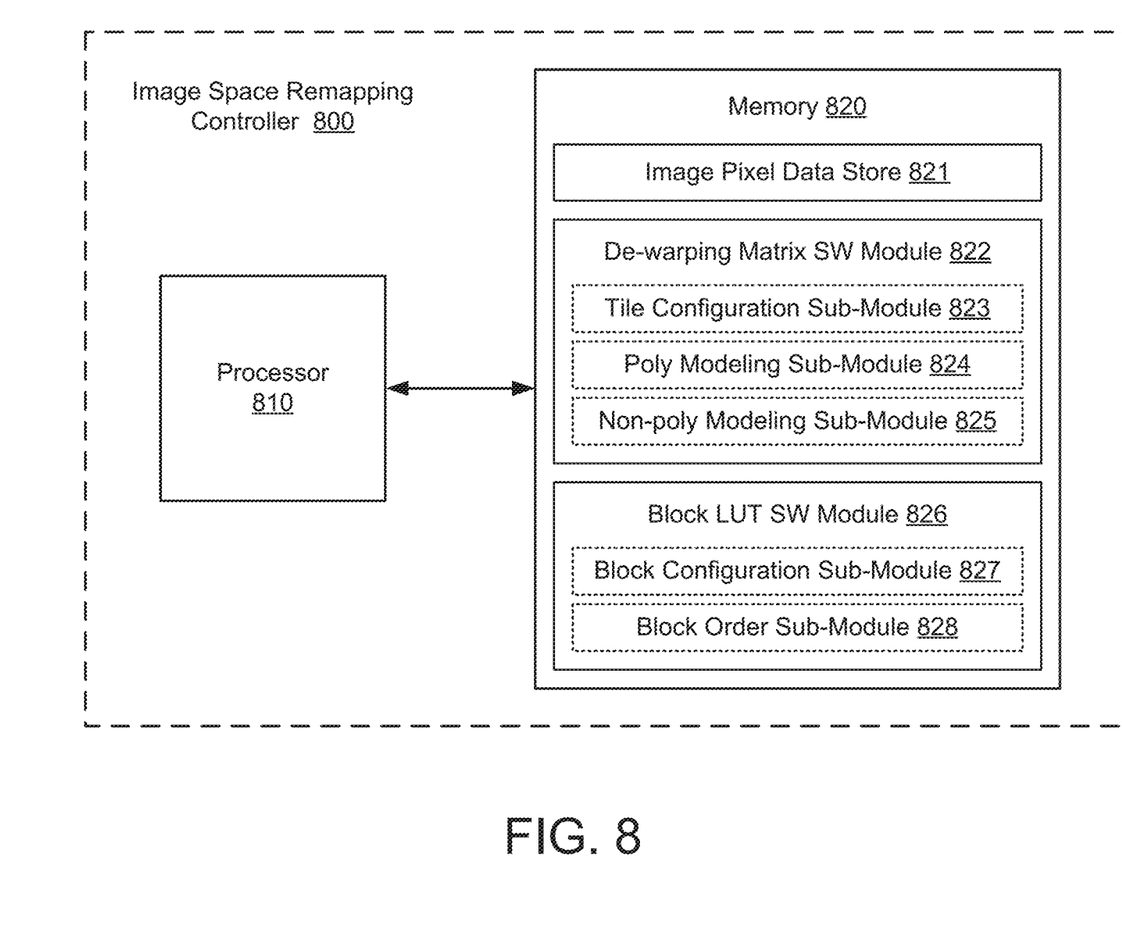
FIG. 8 shows another block diagram of an image space remapping controller, in accordance with some embodiments.

FIG. 8 shows another block diagram of an image space remapping controller 800, in accordance with some embodiments. The remapping controller 800 may be implemented in an LGDC system (such as the LGDC system 500 of FIG. 5). Thus, the remapping controller 800 may be one embodiment of the image space remapping controller 600 of FIG. 6. The remapping controller 800 includes a processor 810 and a memory 820.

The memory 820 may include an image pixel data store 821 configured to store image capture data and/or image render data. For example, the image capture data may correspond to an image of a scene in a distorted image space and the image render data may correspond to an image of the scene in a corrected image space. The memory 820 may also include a non-transitory computer-readable medium (e.g., one or more nonvolatile memory elements, such as EPROM, EEPROM, Flash memory, a hard drive, etc.) that may store at least the following software (SW) modules:

- a de-warping matrix SW module 822 to generate a plurality of de-warping matrices representing a pixel mapping between tiles of the corrected image space (CIS) and blocks of the distorted image space (DIS), the de-warping matrix SW module 822 further including:
    - a tile configuration sub-module 823 to configure a size of each CIS tile based, at least in part, on a memory bandwidth utilization of the LGDC system;
    - a polynomial modeling sub-module 824 to determine the pixel mapping based on a polynomial lens model; and
    - a non-polynomial modeling sub-module 825 to determine the pixel mapping based on a non-polynomial lens model; and
- a block LUT SW module 826 to generate a plurality of block LUTs identifying one or more DIS blocks associated with each de-warping matrix, the block LUT SW module 826 further including:
    - a block configuration sub-module 827 to configure a size of each DIS block based, at least in part, on a memory bandwidth utilization of the LGDC system; and
    - a block order sub-module 828 to determine a fetch order of each of the DIS blocks based, at least in part, on an order of the de-warping matrices.

Each software module includes instructions that, when executed by the processor 810, cause the remapping controller 800 to perform the corresponding functions.

The processor 810 may be any suitable one or more processors capable of executing scripts or instructions of one or more software programs stored in the remapping controller 800. For example, the processor 810 may execute the instructions 822-828 to generate a stride-remapping data set (such as the data set 604 of FIG. 6) for each stride of the corrected image space. In some embodiments, the processor 810 may be configured to operate on multiple strides concurrently or in parallel (e.g., using multithreading) for improved latency. More specifically, the software process latency may be reduced by increasing the number of concurrent threads operated on by the processor 810.

The processor 810 may execute the de-warping matrix SW module 822 to generate a plurality of de-warping matrices representing a pixel mapping between CIS tiles and DIS blocks. In executing the de-warping matrix SW module 822, the processor 810 may further execute the tile configuration sub-module 823, the polynomial modeling sub-module 824, and/or the non-polynomial modeling sub-module 825. For example, the processor 810 may execute the tile configuration sub-module 823 to configure a size of each CIS tile based, at least in part, on a memory bandwidth utilization of the LGDC system. Further, the processor 810 may execute the polynomial modeling sub-module 824 to determine the pixel mapping based on a polynomial lens model. Still further, the processor 810 may execute the non-polynomial modeling sub-module 825 to determine the pixel mapping based on a non-polynomial lens model.

The processor 810 may also execute the block LUT SW module 826 to generate a plurality of block LUTs identifying one or more DIS blocks associated with each de-warping matrix. In executing the block LUT SW module 826, the processor 810 may further execute the block configuration sub-module 827 and/or the block order sub-module 828. For example, the processor 810 may execute the block configuration sub-module 827 to configure a size of each DIS block based, at least in part, on a memory bandwidth utilization of the LGDC system. Further, the processor 810 may execute the block order sub-module 828 to determine a fetch order of each of the DIS blocks based, at least in part, on an order of the de-warping matrices.

Figure 9:
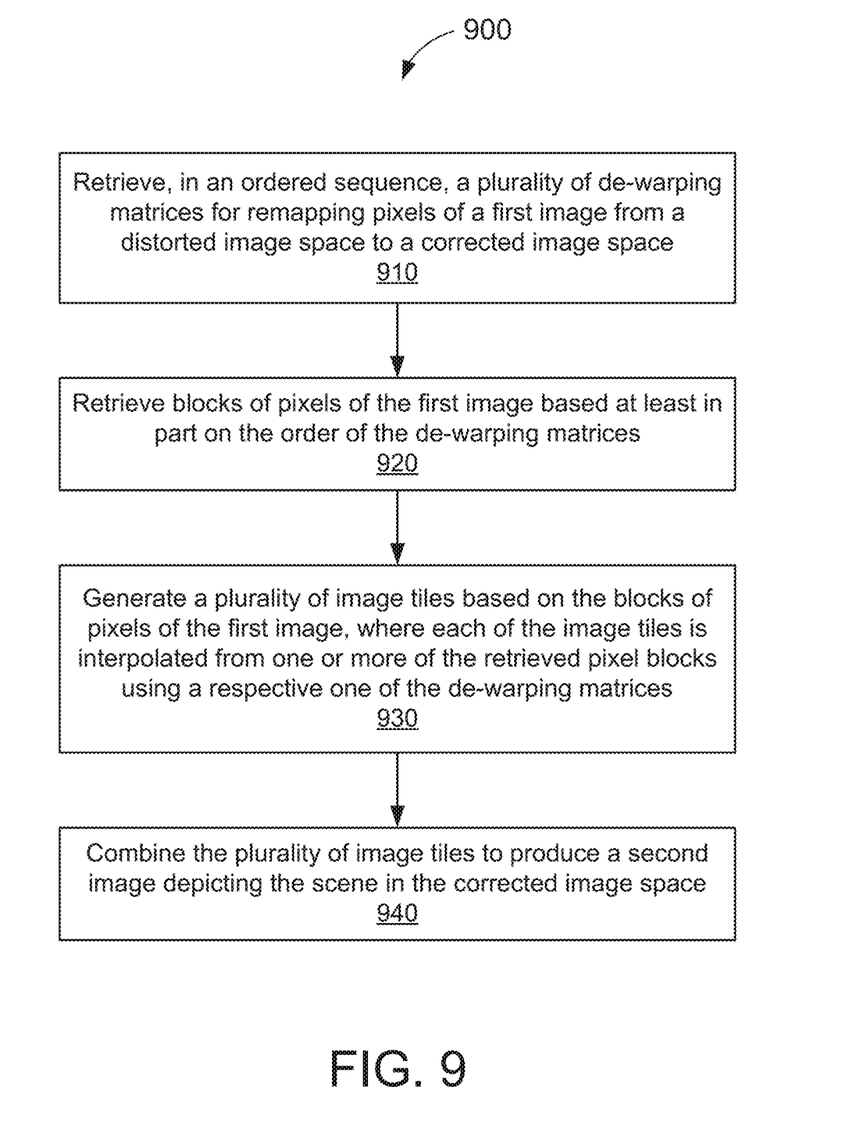
FIG. 9 is an illustrative flowchart depicting an example image processing operation, in accordance with some embodiments.

FIG. 9 is an illustrative flowchart depicting an example image processing operation 900, in accordance with some embodiments. With reference for example to FIG. 7, the operation 900 may be performed by the tile de-warping circuit 700 to generate corrected image data based on distorted image data.

The de-warping circuit may retrieve, in an ordered sequence, a plurality of de-warping matrices for remapping pixels of a first image from a distorted image space to a corrected image space (910). The first image may depict a scene in the distorted image space. For example, the de-warping circuit may retrieve a stride-remapping data set from memory. The data set may include a plurality of de-warping pixels arranged in a raster order. Each de-warping matrix may define a pixel mapping between a respective CIS tile and one or more DIS blocks.

The de-warping circuit may retrieve blocks of pixels of the first image based at least in part on the order of the de-warping matrices (920). For example, the stride-remapping data set may further include a block LUT which identifies the DIS blocks that serve each de-warping matrix. Thus, the order of the DIS blocks may depend, at least in part, on the order in which the de-warping matrices are to be retrieved and processed by the de-warping circuit. In some embodiments, the de-warping circuit may retrieve the DIS blocks in the order specified in the LUT.

The de-warping circuit may generate a plurality of image tiles based on the blocks of pixels of the first image, where each of the image tiles is interpolated from one or more of the retrieved pixel blocks using a respective one of the de-warping matrices (930). For example, the de-warping circuit may process each tile of the corrected image space based on the retrieved DIS blocks and a respective de-warping matrix. In some embodiments, the de-warping circuit may generate each CIS tile based on a bicubic interpolation of the reference points indicated by the de-warping matrix in the DIS blocks.

The de-warping circuit may then combine the plurality of image tiles to produce a second image depicting the scene in the corrected image space (940). As described above with respect to FIG. 3, the plurality of CIS tiles, when arranged in raster order, may form a full-frame image of the corrected image space. In some embodiments, the de-warping circuit may write each interpolated tile back to memory before processing the next tile in the corrected image space (or the next de-warping matrix). Accordingly, the image render device (or image analysis device) may render the second image, in near real-time, as the de-warping is completed by the de-warping circuit.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In the foregoing specification, embodiments have been described with reference to specific examples thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method of image processing, comprising:
retrieving, in an ordered sequence, a plurality of de-warping matrices for remapping pixels of a first image from a distorted image space to a corrected image space, wherein the first image depicts a scene in the distorted image space, and wherein retrieving the plurality of de-warping matrices includes:
retrieving a plurality of first de-warping matrices each indicating a mapping between a respective image tile of a first stride of a plurality of strides and one or more first blocks of pixels of the first image; and
retrieving a plurality of second de-warping matrices each indicating a mapping between a respective image tile of a second stride of the plurality of strides and one or more second blocks of pixels of the first image, the plurality of second de-warping matrices being retrieved only after each of the plurality of first de-warping matrices has been retrieved;
retrieving blocks of pixels of the first image based at least in part on the order of the plurality of de-warping matrices;
generating a plurality of image tiles based on the retrieved blocks of pixels of the first image, wherein each of the plurality of image tiles is interpolated from one or more of the retrieved pixel blocks using a respective one of the plurality of de-warping matrices; and
combining the plurality of image tiles to produce a second image depicting the scene in the corrected image space, wherein the second image is segmented into a plurality of strides of uniform height and width, the height of each stride being equal to a height of one of the plurality of image tiles and the width of each stride being equal to a width of the second image, and wherein each of the strides comprises two or more of the plurality of image tiles in sequence.

2. The method of claim 1, wherein each of the pixel blocks comprises a plurality of first pixels of the first image, and wherein each of the plurality of image tiles comprises a plurality of second pixels of the second image.

3. The method of claim 2, wherein a number of the plurality of first pixels in each pixel block is greater than a number of the plurality of second pixels in each of the plurality of image tiles.

4. The method of claim 2, wherein each of the second pixels is interpolated from one or more of the first pixels using bicubic interpolation.

5. The method of claim 1, wherein the ordered sequence is based at least in part on a raster order.

6. The method of claim 5, wherein the combining comprises:
storing the plurality of image tiles in the raster order.

7. The method of claim 1, wherein the retrieving of the blocks of pixels comprises:
retrieving a first lookup table (LUT) identifying the blocks of pixels used to generate the image tiles of the first stride of the plurality of strides; and
retrieving a second LUT identifying the blocks of pixels used to generate the image tiles of the second stride of the plurality of strides only after each of the blocks of pixels identified by the first LUT has been retrieved.

8. The method of claim 1, wherein the first image is captured by an image capture device, the method further comprising:
generating the plurality of de-warping matrices based at least in part on one or more geometric distortion parameters or a focal length of a lens of the image capture device.

9. The method of claim 8, wherein the lens introduces non-linear distortions in the scene depicted by the first image, and wherein the scene depicted by the second image is rectilinear.

10. The method of claim 8, further comprising:
selecting a size of each of the plurality of image tiles or pixel blocks based at least in part on the one or more geometric distortion parameters or the focal length.

11. The method of claim 8, wherein the plurality of de-warping matrices is generated based on a polynomial lens model.

12. The method of claim 8, wherein the plurality of de-warping matrices is generated based on a non-polynomial lens model.

13. The method of claim 1, further comprising:
selecting a size of each of the plurality of image tiles or pixel blocks based at least in part on a memory bandwidth requirement for generating each of the plurality of image tiles.

14. The method of claim 13, wherein the selection is further based on an image format or pixel depth of the first image.

15. A de-warping circuit comprising:
a memory buffer; and
hardware logic configured to:
retrieve, in an ordered sequence, a plurality of de-warping matrices for remapping pixels of a first image from a distorted image space to a corrected image space, wherein the first image depicts a scene in the distorted image space, and wherein retrieving the plurality of de-warping matrices includes:
retrieving a plurality of first de-warping matrices each indicating a mapping between a respective image tile of a first stride of a plurality of strides and one or more first blocks of pixels of the first image; and
retrieving a plurality of second de-warping matrices each indicating a mapping between a respective image tile of a second stride of the plurality of strides and one or more second blocks of pixels of the first image, the plurality of second de-warping matrices being retrieved only after each of the plurality of first de-warping matrices has been retrieved;
read, into the memory buffer, blocks of pixels of the first image based at least in part on the order of the plurality of de-warping matrices;
generate a plurality of image tiles based on the retrieved blocks of pixels of the first image, wherein each of the plurality of image tiles is interpolated from one or more of the blocks of pixels using a respective one of the plurality of de-warping matrices; and
write the plurality of image tiles to an external memory to produce a second image depicting the scene in the corrected image space, wherein the second image is segmented into a plurality of strides of uniform height and width, the height of each stride being equal to a height of one of the plurality of image tiles and the width of each stride being equal to a width of the second image, and wherein each of the strides comprises two or more of the plurality of image tiles in sequence.

16. The de-warping circuit of claim 15, wherein each of the pixel blocks comprises a plurality of first pixels of the first image, and wherein each of the plurality of image tiles comprises a plurality of second pixels of the second image.

17. The de-warping circuit of claim 16, wherein the plurality of first pixels in each pixel block is greater than the plurality of second pixels in each of the plurality of image tiles.

18. The de-warping circuit of claim 15, wherein the ordered sequence is based at least in part on a raster order.

19. The de-warping circuit of claim 18, wherein the hardware logic is further configured to store the plurality of image tiles in the raster order.

20. The de-warping circuit of claim 15, wherein the hardware logic is configured to read the blocks of pixels into the memory buffer by:
retrieving a first lookup table (LUT) identifying the blocks of pixels used to generate the image tiles of the first stride of the plurality of strides; and
retrieving a second LUT identifying the blocks of pixels used to generate the image tiles of the second stride of the plurality of strides only after each of the blocks of pixels identified by the first LUT has been retrieved.

21. A system comprising:
a processor;
a memory storing instructions that, when executed by the processor, cause the system to:
generate, in an ordered sequence, a plurality of de-warping matrices for remapping pixels from a distorted image space to a corrected image space; and
a de-warping circuit configured to:
retrieve a plurality of first de-warping matrices each indicating a mapping between a respective image tile of a first stride of a plurality of strides and one or more first blocks of pixels of the first image;
retrieve a plurality of second de-warping matrices each indicating a mapping between a respective image tile of a second stride of the plurality of strides and one or more second blocks of pixels of the first image, the plurality of second de-warping matrices being retrieved only after each of the plurality of first de-warping matrices has been retrieved;
retrieve blocks of pixels of a first image based at least in part on the order of the plurality of de-warping matrices, the first image depicting a scene in the distorted image space;
generate a plurality of image tiles based on the retrieved blocks of pixels of the first image, wherein each of the plurality of image tiles is interpolated from one or more of the retrieved pixel blocks using a respective one of the plurality of de-warping matrices; and
combine the plurality of image tiles to produce a second image depicting the scene in the corrected image space, wherein the second image is segmented into a plurality of strides of uniform height and width, the height of each stride being equal to a height of one of the plurality of image tiles and the width of each stride being equal to a width of the second image, and wherein each of the strides comprises two or more of the plurality of image tiles in sequence.

22. The system of claim 21, wherein the plurality of de-warping matrices is generated based on a polynomial lens model.

23. The system of claim 21, wherein the plurality of de-warping matrices is generated based on a non-polynomial lens model.

24. The system of claim 21, wherein execution of the instructions further causes the system to:
select a size of each of the plurality of image tiles or pixel blocks based at least in part on a memory bandwidth requirement for generating each of the plurality of image tiles.

25. The system of claim 24, wherein the selection is further based on an image format or pixel depth of the first image.

* * * * *